(12) United States Patent
Wang et al.

(10) Patent No.: US 9,727,721 B2
(45) Date of Patent: Aug. 8, 2017

(54) METHOD AND DEVICE FOR UNLOCKING ELECTRONIC EQUIPMENT AND UNLOCKING KEY THEREOF

(71) Applicant: ZTE Corporation, Shenzhen, Guangdong (CN)

(72) Inventors: Weiping Wang, Shenzhen (CN); Xiaobo Zhang, Shenzhen (CN); Yajun Gou, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 2 days.

(21) Appl. No.: 14/416,867

(22) PCT Filed: Jul. 24, 2013

(86) PCT No.: PCT/CN2013/080005
§ 371 (c)(1),
(2) Date: Jan. 23, 2015

(87) PCT Pub. No.: WO2014/015803
PCT Pub. Date: Jan. 30, 2014

(65) Prior Publication Data
US 2015/0186637 A1    Jul. 2, 2015

(30) Foreign Application Priority Data
Jul. 24, 2012 (CN) .......................... 2012 1 0257831

(51) Int. Cl.
*H04L 9/08* (2006.01)
*G06F 21/44* (2013.01)
(Continued)

(52) U.S. Cl.
CPC .............. *G06F 21/44* (2013.01); *G06F 21/35* (2013.01); *G06F 21/445* (2013.01);
(Continued)

(58) Field of Classification Search
CPC ...... G07C 2009/00404; G07C 9/00174; G07C 9/00309; G07C 2009/00396;
(Continued)

(56) References Cited

U.S. PATENT DOCUMENTS

| 5,252,965 | A |  | 10/1993 | Gidwani |
| 6,236,333 | B1 | * | 5/2001 | King .................... B60R 25/2036 340/10.1 |

(Continued)

FOREIGN PATENT DOCUMENTS

| CN | 101298817 A | 11/2008 |
| CN | 102063602 A | 11/2008 |

(Continued)

OTHER PUBLICATIONS

International Search Report in international application No. PCT/CN2013/080005, mailed on Oct. 31, 2013.
(Continued)

*Primary Examiner* — Eric W Shepperd
(74) *Attorney, Agent, or Firm* — Oppedahl Patent Law Firm LLC (57) ABSTRACT

Disclosed is a method for unlocking an electronic equipment, and the method includes: the electronic equipment detects periodically whether there is an unlocking key in its surrounding environment, and when there is an unlocking key in the surrounding environment, transmits an unlocking request to the unlocking key; the unlocking key receives the unlocking request, determines in accordance with the unlocking request whether the electronic equipment matches the unlocking key, and when it is determined that the electronic equipment matches the unlocking key, transmits an unlocking signal to the electronic equipment so as to unlock the electronic equipment. Further disclosed are a device for unlocking an electronic equipment and an unlock-
(Continued)

ing key for unlocking an electronic equipment. By means of the present disclosure, the unlocking key is enabled to automatically unlock an electronic equipment when it is disposed near the electronic equipment.

7 Claims, 3 Drawing Sheets

(51) Int. Cl.
*H04L 9/32* (2006.01)
*H04M 1/67* (2006.01)
*G06F 21/35* (2013.01)
*G07C 9/00* (2006.01)
*H04M 1/725* (2006.01)
*H04L 29/06* (2006.01)

(52) U.S. Cl.
CPC ........ *G07C 9/00309* (2013.01); *H04L 9/0819* (2013.01); *H04L 9/3226* (2013.01); *H04L 63/0838* (2013.01); *H04M 1/67* (2013.01); *G06F 2221/2111* (2013.01); *G07C 2209/63* (2013.01); *H04L 63/0428* (2013.01); *H04L 2209/24* (2013.01); *H04M 1/7253* (2013.01); *H04M 2250/02* (2013.01)

(58) Field of Classification Search
CPC ........... G07C 2009/00412; G06F 21/30; G06F 21/34; G06F 21/35; G06F 21/44; G06F 21/445; G06F 2221/2111; H04L 9/085; H04L 9/3226; H04L 63/0428; H04L 63/08; H04L 63/0876; H04L 63/12
See application file for complete search history.

(56) References Cited

U.S. PATENT DOCUMENTS

| | | | | |
|---|---|---|---|---|
| 6,538,560 | B1* | 3/2003 | Stobbe | B29C 44/56 340/5.72 |
| 2001/0033222 | A1* | 10/2001 | Nowottnick | G07C 9/00309 340/5.61 |
| 2003/0222757 | A1* | 12/2003 | Ghabra | B60R 25/24 340/5.72 |
| 2005/0037734 | A1 | 2/2005 | Tanaka | |
| 2007/0229257 | A1 | 10/2007 | Bliding | |
| 2008/0146196 | A1 | 6/2008 | Tanaka | |
| 2008/0181220 | A1* | 7/2008 | Babbar | H04L 69/16 370/389 |
| 2009/0091423 | A1* | 4/2009 | Nagaoka | B60R 25/24 340/5.72 |
| 2009/0184801 | A1 | 7/2009 | Bliding | |
| 2010/0141381 | A1* | 6/2010 | Bliding | G07C 9/00309 340/5.61 |
| 2010/0148921 | A1 | 6/2010 | Bliding | |
| 2011/0082882 | A1* | 4/2011 | Denison | G07C 9/00571 707/770 |
| 2011/0084799 | A1* | 4/2011 | Ficko | G07C 9/00904 340/5.65 |
| 2013/0031459 | A1* | 1/2013 | Khorashadi | G06F 17/30905 715/234 |
| 2013/0238700 | A1* | 9/2013 | Papakipos | G06F 21/81 709/204 |
| 2014/0020437 | A1 | 1/2014 | Bliding | |
| 2014/0022054 | A1 | 1/2014 | Bliding et al. | |
| 2014/0359049 | A1* | 12/2014 | Petersen | H04L 67/1095 709/213 |
| 2015/0045013 | A1* | 2/2015 | Simmons | H04W 4/008 455/420 |
| 2017/0069148 | A1* | 3/2017 | Gilbertson | G07C 9/00071 |

FOREIGN PATENT DOCUMENTS

| | | |
|---|---|---|
| CN | 102436686 A | 5/2012 |
| CN | 102882679 A | 1/2013 |
| EP | 0503695 A1 | 9/1992 |
| EP | 2434463 A2 | 3/2012 |
| SE | EP 2434463 A2 * 3/2012 ............ E05B 49/00 |

OTHER PUBLICATIONS

English Translation of the Written Opinion of the International Search Authority in international application No. PCT/CN2013/080005, mailed on Oct. 31, 2013.
Bluetooth Architecture Overview, mailed on Mar. 1999.
Low-latency indoor localization using bluetooth beacons, mailed on Oct. 4, 2009.
Supplementary European Search Report in European application No. 13823328.3, mailed on Jul. 9, 2015.

* cited by examiner

METHOD AND DEVICE FOR UNLOCKING ELECTRONIC EQUIPMENT AND UNLOCKING KEY THEREOF

TECHNICAL FIELD

The present disclosure relates to techniques for unlocking an electronic equipment, and in particular to a method and device for unlocking an electronic equipment and an unlocking key thereof.

BACKGROUND

At present, among electronic equipments such as Personal Digital Assistances (PDAs), palm computers, smart phones and the like, most of them have a function of locking itself so as to protect user's privacy and data and prevent user's mis-operations. Furthermore, with the development of touch screen techniques, most of electronic equipments are equipped with a touch screen, and operations performed on a touch screen is regarded as a primary way for an electronic equipment to interact with a user. For above electronic equipments equipped with a touch screen, input characteristics of the touch screen can be used to unlock their locked states. For example, for a mobile phone having a touch screen, a virtual key can be used to unlock its locked state. Generally, after an unlocking button is pressed, an unlocking image will be displayed on an unlocking interface, a user can unlock an electronic equipment only if he/she moves the unlocking image according to a predefined path or moves the unlocking image to a target position. However, when using such an unlocking method, a user needs to painstakingly keep in heart an unlocking password or unlocking graph, and once the user forgets the graph or password, the electronic equipment needs to be reset, which makes too much trouble and inconvenience. Moreover, when using such an unlocking method, the user needs to perform a corresponding unlocking operation on the touch screen when unlocking the electronic equipment, thus further lowering the convenience of using the electronic equipment.

SUMMARY

The present disclosure provides a method and device for unlocking an electronic equipment and an unlocking key thereof so as to improve the convenience in using an electronic equipment.

An embodiment of the present disclosure provides a method for unlocking an electronic equipment, and the method includes: the electronic equipment detects periodically whether there is an unlocking key in its surrounding environment, and when there is an unlocking key in the surrounding environment, transmits an unlocking request to the unlocking key; the unlocking key receives the unlocking request, determines in accordance with the unlocking request whether the electronic equipment matches the unlocking key, and when it is determined that the electronic equipment matches the unlocking key, transmits an unlocking signal to the electronic equipment so as to unlock the electronic equipment.

Preferably, the step of detecting periodically, by the electronic equipment, whether there is an unlocking key in its surrounding environment may include:
the electronic equipment outputs a wireless signal;
the unlocking key receives the wireless signal and acquires information carried in the wireless signal;
the unlocking key determines whether the information carried in the wireless signal is consistent with preset information, and when it is determined that the information carried in the wireless signal is consistent with the preset information, outputs an acknowledgement signal to the electronic equipment;
the electronic equipment determines whether the acknowledgement signal is received within a preset period of time, determines that there is an unlocking key in the surrounding environment when it is determined that the acknowledgement signal is received within the preset period of time, and determines that there isn't an unlocking key in the surrounding environment when it is determined that the acknowledgement signal is not received within the preset period of time.

Preferably, the step of transmitting an unlocking request to the unlocking key may include:
an identification code of the electronic equipment is acquired, the identification code is encrypted, and the encrypted identification code is output to the unlocking key.

Preferably, the receiving by the unlocking key the unlocking request and determining in accordance with the unlocking request whether the electronic equipment matches the unlocking key may include:
the unlocking key receives the encrypted identification code, decrypts the encrypted identification code, and acquires the identification code of the electronic equipment;
it is determined whether the identification code of the electronic equipment is consistent with a preset identification code, it is determined that the electronic equipment matches the unlocking key when it is determined that the identification code of the electronic equipment is consistent with the preset identification code, and it is determined that the electronic equipment doesn't match the unlocking key when it is determined that the identification code of the electronic equipment is inconsistent with the preset identification code.

An embodiment of the present disclosure further provides a device for unlocking an electronic equipment, and the unlocking key includes a controller arranged in the electronic equipment and an unlocking key that is independent from the electronic equipment, wherein
the controller is configured to detect periodically whether there is an unlocking key in its surrounding environment, and when there is an unlocking key in the surrounding environment, transmit an unlocking request to the unlocking key; and unlock the electronic equipment after receiving an unlocking signal from the unlocking key;
the unlocking key is configured to receive the unlocking request, determine in accordance with the unlocking request whether the electronic equipment matches the unlocking key, and when it is determined that the electronic equipment matches the unlocking key, transmit the unlocking signal to the controller.

Preferably, the controller may include a wireless signal transmission module and a determination module, and the unlocking key may include a first processing module;
the wireless signal transmission module may be configured to output a wireless signal, and continue to output the wireless signal to its surrounding environment after receiving a searching failure signal output by the determination module;
the first processing module may be configured to receive the wireless signal, acquire information carried in the wireless signal, determine whether the information carried in the wireless signal is consistent with preset information, and when it is determined that the information carried in the wireless signal is consistent with preset information, output an acknowledgement signal to the determination module;

the determination module may be configured to receive the acknowledgement signal and determine whether the acknowledgement signal is received within a preset period of time, when it is determined that the acknowledgement signal is received within the preset period of time, determine that there is an unlocking key in the surrounding environment and output a determination signal, and when it is determined that the acknowledgement signal is not received within the preset period of time, determine that there isn't an unlocking key in the surrounding environment and output the searching failure signal to the wireless signal transmission module.

Preferably, the controller may further include an acquisition module and an encryption module;

the acquisition module may be configured to receive the determination signal and acquire an identification code of the electronic equipment;

the encryption module may be configured to encrypt the identification code of the electronic equipment and out the encrypted identification code.

Preferably, the controller may further include an execution module and the unlocking key may further include a second processing module;

the second processing module may be configured to decrypt the encrypted identification code, acquire the identification code of the electronic equipment and determine whether the identification code of the electronic equipment is consistent with a preset identification code, when it is determined that the identification code of the electronic equipment is consistent with the preset identification code, determine that the electronic equipment matches the unlocking key where the second processing module itself is located and output an unlocking signal to the execution module, when it is determined that the identification code of the electronic equipment is inconsistent with the preset identification code, determine that the electronic equipment doesn't match the unlocking key where the second processing module itself is located;

the execution module may be configured to unlock the electronic equipment after receiving the unlocking signal.

An embodiment of the present disclosure further provides an unlocking key for unlocking an electronic equipment, and the unlocking key is configured to receive an unlocking request transmitted by the electronic equipment, determine in accordance with the unlocking request whether the electronic equipment matches the unlocking key, and when it is determined that the electronic equipment matches the unlocking key, transmit an unlocking signal to the electronic equipment so as to unlock the electronic equipment.

Preferably, the unlocking request may be an identification code of the electronic equipment, and the unlocking key may include a first processing module and a second processing module;

the first processing module may be configured to receive a wireless signal output by the electronic equipment, acquire information carried in the wireless signal and determine whether the information carried in the wireless signal is consistent with preset information, and when it is determined that the information carried in the wireless signal is consistent with preset information, output an acknowledgement signal to the electronic equipment;

the second processing module may be configured to receive and decrypt the encrypted identification code of the electronic equipment, which is transmitted by the electronic equipment, determine whether the identification code of the electronic equipment is consistent with a preset identification code, and when it is determined that the identification code of the electronic equipment is consistent with a preset identification code, determine that the electronic equipment matches the unlocking key where the second processing module itself is located and output the unlocking signal.

By means of the method and device for unlocking an electronic equipment and an unlocking key thereof provided by embodiments of the present disclosure, through the controller arranged in the electronic equipment and the unlocking key that is independent from the electronic equipment, it is possible that when a user carrying an unlocking key approaches an electronic equipment, the controller can detect the presence of the unlocking key and then transmit to the unlocking key an identification code of the electronic equipment, the unlocking key can thus transmit automatically, when it matches the electronic equipment, an unlocking signal to the electronic equipment so as to unlock the electronic equipment, thus the user can unlock the electronic equipment without any manual operations, thereby facilitating convenience of using the electronic equipment.

DETAILED DESCRIPTION

In order to make objectives, technical solutions and advantages of the present disclosure more clear, the present disclosure will be further elaborated below in combination with the accompanying drawings and embodiments. It should be understood that the specific embodiments are only used to interpret the present disclosure instead of limiting the present disclosure.

Figure 1:
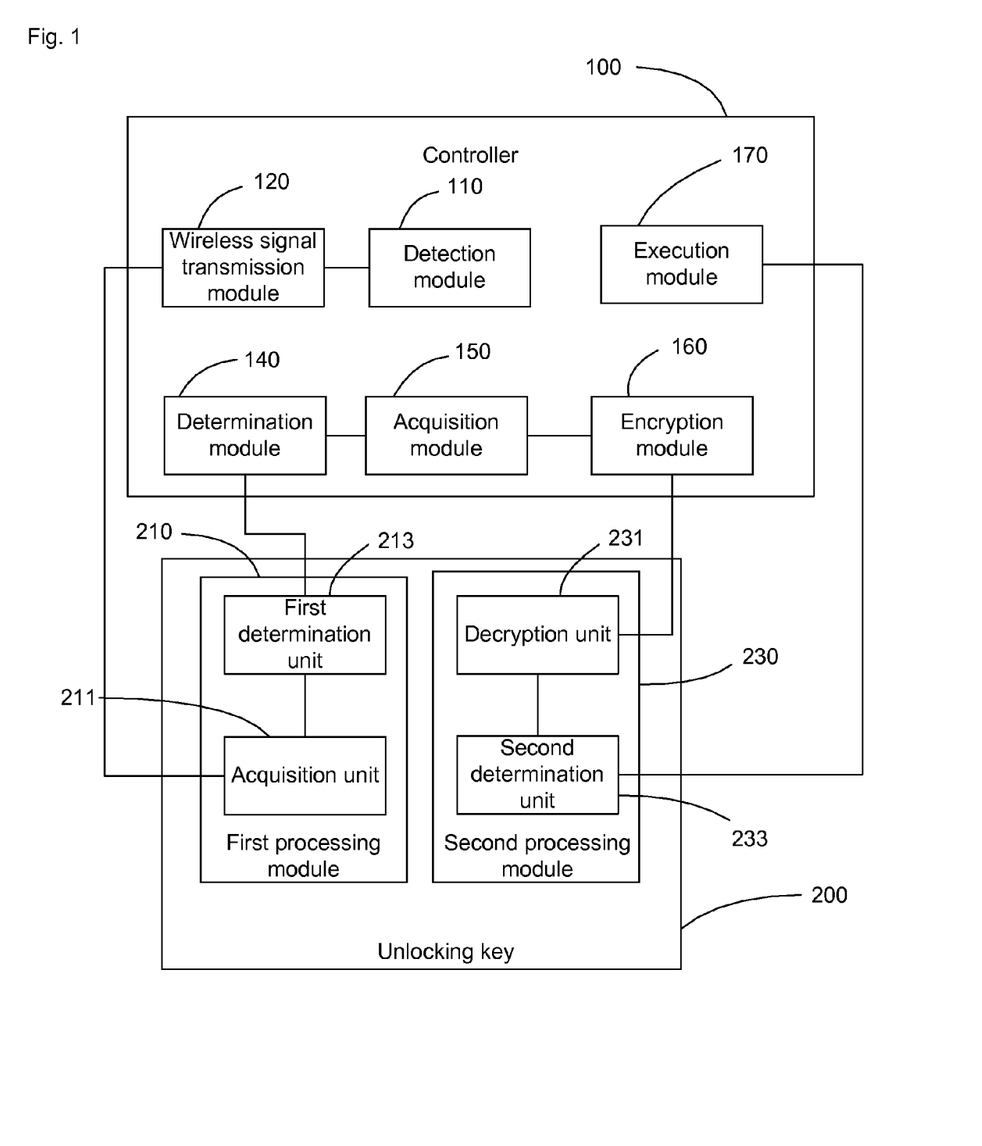
FIG. 1 is a schematic block diagram of an unlocking device according to an embodiment of the present disclosure.

Referring to FIG. 1, it is a schematic block diagram of an unlocking device according to an embodiment of the present disclosure. In an embodiment, the unlocking device can be used to unlock an electronic equipment, such as a mobile phone, a music player, a PDA or a tablet computer and the like so that a user can operate the electronic device after it is unlocked, for example, using the electronic equipment to perform operations such as dialing-up or playing music after it is unlocked. In the embodiment, the unlocking device includes a controller 100 and an unlocking key 200. The controller 100 is arranged in an electronic equipment and is configured to, when the electronic equipment is in a locked state, detect periodically whether there is the unlocking key 200 in its surrounding environment, and when there is the unlocking key 200 in the surrounding environment, transmit an unlocking request to the unlocking key 200, and perform subsequent operations according to feedbacks from the unlocking key 200. The unlocking key 200 is independent from and connected wirelessly to the electronic equipment, and is configured to receive the unlocking request from the controller 100 and determine in accordance with the unlocking request whether the electronic equipment matches the unlocking key 200, and if the electronic equipment matches the unlocking key 200, transmit an unlocking signal to the controller 100 so as to unlock the electronic equipment.

The controller 100 includes a detection module 110, a wireless signal transmission module 120, a determination module 140, an acquisition module 150, an encryption module 160 and an execution module 170. The detection module 110 is configured to detect the state of the electronic equipment, and output a detection signal when the electronic equipment is in a locked state. The wireless signal transmission module 120 is connected to the detection module 110, and is configured to receive the detection signal and output a wireless signal. In the embodiment, the wireless signal can be a Bluetooth signal, and the signal is configured to carry in it information of an unlocking key that match the electronic equipment, such as graphic identifier information and the like. Roles and functions of the determination module 130, the acquisition module 140, the encryption module 150 and the execution module 170 will be described in detail in subsequent descriptions.

The unlocking key 200 includes a first processing module 210 and a second processing module 230. The first processing module 210 is connected wirelessly to the wireless signal transmission module 120, and is configured to receive the wireless signal transmitted by the wireless signal transmission module 120, determine whether information carried in the wireless signal is consistent with preset information, and when the information carried in the wireless signal is consistent with the preset information, transmit an acknowledgement signal to the controller. Specifically, the first processing module 210 includes an acquisition unit 211 and a first determination unit 213. Here, the acquisition unit 211 is configured to acquire wireless signals in its surrounding environment, and is configured to, particularly when it is close to the electronic equipment, acquire the wireless signal from the wireless signal transmission module 120, acquire information carried in the wireless signal and output acquired information. The first determination unit 213 is connected to the acquisition unit 211, and is configured to receive the acquired information output by the acquisition unit 211, and determine whether the information is consistent with the preset information. In the embodiment, the preset information can be graphic identifier information corresponding to the unlocking key 200 that is stored in the unlocking key 200. For example, when graphic information is carried in the wireless signal, after acquiring the graphic information carried in the wireless signal, the acquisition unit 211 outputs the graphic information to the first determination unit 213, then the first determination unit 213 determines whether the graphic information is consistent with graphical identifier information pre-stored in the unlocking key 200, if the graphic information is consistent with graphical identifier information pre-stored in the unlocking key 200, transmits the acknowledgement signal, otherwise outputs an error signal to the acquisition unit 211, and after receiving the error signal, the acquisition unit 211 continues to detect and acquire a wireless signal in the surrounding environment. It can be appreciated that, in the embodiment, information for positioning or uniquely identifying the unlocking key 200 can be carried in the acknowledgement signal output by the first determination unit 213. The role and function of the second processing module 230 will be described in detail in subsequent descriptions.

The determination module 140 of the controller 100 is connected wirelessly to the first determination unit 213, and is configured to detect and receive in real time the acknowledgement signal from the first determination unit 213, and determine whether the acknowledgement signal is received within a preset period of time, if Yes, output a determination signal to the acquisition module 150, otherwise, output a searching failure signal to the wireless signal transmission module 120 so that the wireless signal transmission module 120 continues to output a wireless signal to its surrounding environment. The acquisition module 150 is connected to the determination module 140, and is configured to receive the determination signal output by the determination unit 140 and output a corresponding unlocking request. In the embodiment, the unlocking request is an identification code that can uniquely identify an electronic equipment. After receiving the determination signal from the determination module 140, the acquisition module 150 acquires an identification code corresponding to the electronic equipment and outputs the identification code. The encryption module 160 is connected to the acquisition module 150, and is configured to receive the unlocking request output by the acquisition module 150, that is, in the embodiment, the identification code of the electronic equipment, encrypt the identification code using an encryption method and output the encrypted identification code. In the embodiment, the encryption module 160 may encrypt the identification code using an existing encryption method.

The second processing module 230 of the unlocking key 200 is connected wirelessly to the encryption module 160 of the controller 100, and is configured to receive the unlocking request from the controller 100 and determine in accordance with the unlocking request whether the electronic equipment matches the unlocking key 200, and if Yes, transmit an unlocking signal to the controller 100 so as to unlock the electronic equipment. In the embodiment, the second processing module 230 includes a decryption unit 231 and a second determination unit 233. The decryption unit 231 is connected wirelessly to the encryption module 160 of the controller 100, and is configured to receive the encrypted unlocking request output by the encryption module 160, that is, in the embodiment, the encrypted identification code of the electronic equipment, and perform a decryption operation on the encrypted identification code. The second determination unit 233 is connected to the decryption unit 231, and is configured to acquire an decrypted identification code, and determine whether the identification code is consistent with the preset identification code, if the identification code is consistent with the preset identification code, determine that the unlocking key 200 matches the electronic equipment and output the unlocking signal to the execution module 170 of the controller 100 so that the execution module 170 can be controlled to unlock the electronic equipment; if the identification code is inconsistent with the preset identification code, transmit a control signal to the wireless signal transmission module 120 of the controller 100 so that the wireless signal transmission module 120 continues to output a wireless signal to its surrounding environment. In the embodiment, the preset identification code can be an identification code for uniquely identifying the unlocking key that pre-stored in the unlocking key 200, and the preset identification code is typically a character sequence and is consistent with an identification code of an electronic equipment that matches the unlocking key 200.

By means of the unlocking device provided by embodiments of the present disclosure, through the controller 100 arranged in the electronic equipment and the unlocking key 200 that is independent from the electronic equipment, it is possible that when a user carrying an unlocking key 200 approaches an electronic equipment, the electronic equipment can detect the presence of the unlocking key 200 and then transmit to the unlocking key 200 an identification code of the electronic equipment, the unlocking key 200 can thus transmit automatically, when it matches the electronic equipment, an unlocking signal to the electronic equipment so as to unlock the electronic equipment, thus the user can unlock the electronic equipment without any manual operations, thereby facilitating convenience of using the electronic equipment.

Figure 2:
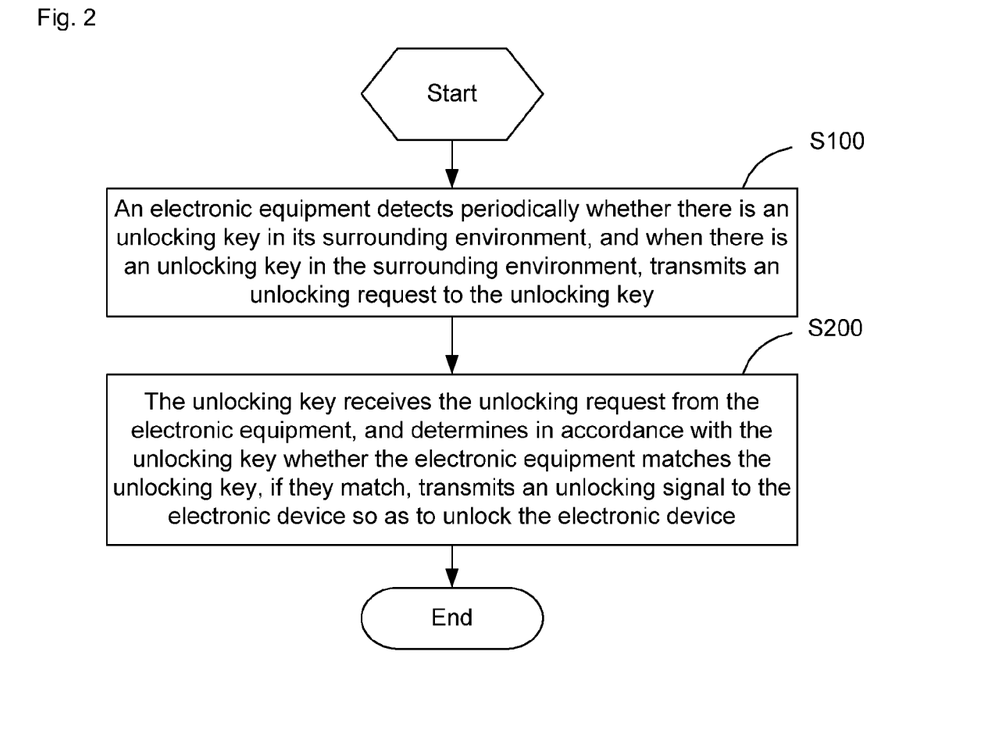
FIG. 2 is a flow chart of an unlocking method according to an embodiment of the present disclosure.

An embodiment of the present disclosure further provides an unlocking method for unlocking an electronic equipment by using the above unlocking device so that a user can unlock the electronic equipment without performing manual operations, thereby facilitating convenience of using the electronic equipment. Referring to FIG. 2, it is a flow chart of an unlocking method according to an embodiment of the present disclosure, and the unlocking method includes the following steps:

Step S100, an electronic equipment detects periodically whether there is an unlocking key in its surrounding environment, and when there is an unlocking key in the surrounding environment, transmits an unlocking request to the unlocking key.

Here, after the electronic equipment is in a locked state, the electronic equipment starts to detect periodically whether there is an unlocking key in its surrounding environment. In the embodiment, the unlocking key can be an unlocking member corresponding to the electronic equipment, and the unlocking member can have a shape of a physical key or can exhibit a card-like shape, and on the unlocking member there is provided a wireless signal transmission module for wireless signal delivery and interaction between the unlocking key and the electronic equipment; the surrounding environment of the electronic equipment is a spatial distance range within which wireless signals transmitted by the electronic equipment can be received.

Step S200, the unlocking key receives the unlocking request from the electronic equipment, and determines in accordance with the unlocking key whether the electronic equipment matches the unlocking key, if the electronic equipment matches the unlocking key, transmits an unlocking signal to the electronic device so as to unlock the electronic device.

Figure 3:
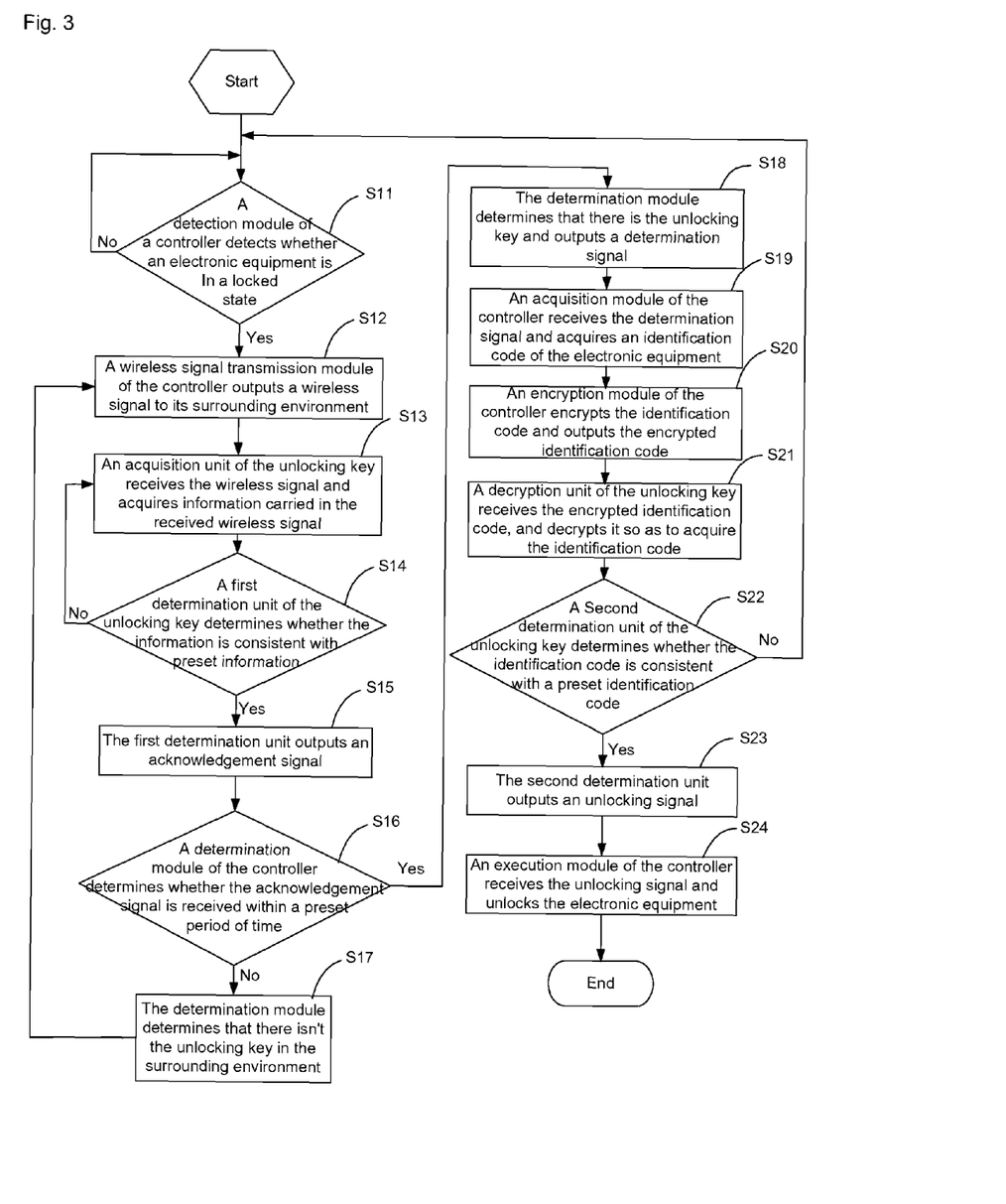
FIG. 3 is a flow chart of a specific application example of an unlocking method according to the present disclosure.

The unlocking method according to an embodiment of the present disclosure will be further described in detail below through a specific application embodiment, in which when a user carrying an unlocking key corresponding to an electronic equipment approaches the electronic equipment, the unlocking key can automatically unlock the electronic equipment. As shown in FIG. 3, the unlocking method includes the following steps:

Step S11, a detection module of a controller detects whether an electronic equipment is in a locked state, if Yes, proceed to step S12, otherwise return to step S11.

Here, the detection module in the embodiment can detect periodically the state of the electronic equipment, for example detecting whether the electronic equipment is in an operation state or a locked state. When detecting that the electronic equipment is in the locked state, the detection module outputs a detection signal.

Step S12, a wireless signal transmission module of the controller outputs a wireless signal to its surrounding environment.

In the embodiment, the wireless signal can be a Bluetooth signal or an infrared signal and the wireless signal carries therein identifier information of an unlocking key that matches the electronic equipment, such as graphic identifier information and the like, and the surrounding environment refers to a spatial distance range within which the Bluetooth signal or the infrared signal can be detected and received.

Step S13, an acquisition unit of a first processing module of the unlocking key receives the wireless signal from the controller and acquires information carried in a received wireless signal.

Here, the acquisition unit detects whether there is a wireless signal, particularly a wireless signal from an electronic equipment that matches the unlocking key, in its surrounding environment. When detecting that there is a wireless signal, the acquisition unit acquires the wireless signal and further acquires information carried in the wireless signal.

Step S14, a first determination unit of the first processing module determines whether the information carried in the wireless signal is consistent with preset information, if the information carried in the wireless signal is consistent with the preset information, proceed to step S15, otherwise, return to step S13. In the embodiment, the preset information can be graphic identifier information corresponding to the unlocking key that is pre-stored in the unlocking key. For example, when graphic information is carried in the wireless signal, after acquiring the graphic information in the wireless signal, the acquisition unit outputs the graphic information to the first determination unit, the first determination unit then determines whether the graphic information is consistent with graphic identifier information of the unlocking key that is pre-stored in the unlocking key, if the graphic information is consistent with graphic identifier information of the unlocking key that is pre-stored in the unlocking key, proceed to step S15, otherwise return to step S13.

Step S15, the first determination unit outputs an acknowledgement signal.

In the embodiment, information for positioning or uniquely identifying the unlocking key can be carried in the acknowledgement signal output by the first determination unit.

Step S16, after receiving the acknowledgement signal, a determination module of the controller determines whether the acknowledgement signal is received within a preset period of time, if Yes, proceed to S18, otherwise proceed to step S17.

In the embodiment, the preset period of time can be set according to different application scenarios, for example it can be set to 5 or 10 seconds, when the determination module determines that the acknowledgement signal is not received after 5 or 10 seconds starting from the output of the wireless signal by the wireless signal transmission module, it is determined that there isn't an unlocking key in the surrounding environment.

Step S17, the determination module determines that there isn't the unlocking key and returns to step S12.

Step S18, the determination module determines that there is the unlocking key and outputs a determination signal.

When the determination module determines that the determination signal is received within the preset period of time, it outputs the determination signal.

Step S19, an acquisition module of the controller receives the determination signal, acquires accordingly an identification code of the electronic equipment and outputs the acquired identification code.

In the embodiment, the identification code of the electronic equipment is a character sequence that can uniquely identify the electronic equipment.

Step S20, an encryption module of the controller receives the identification code, encrypts the identification code and outputs the encrypted identification code.

After receiving the identification code, the encryption module encrypts the identification code using an encryption method so that even though the identification code is received by other electronic equipment(s), the security of the electronic equipment will not be affected.

Step S21, a decryption unit of the unlocking key acquires from the controller the encrypted identification code corresponding to the electronic equipment, and decrypts the encrypted identification code so as to acquire the identification code.

The decryption unit is configured to correspond to the encryption module, and in the decryption unit there is provided a decryption method corresponding to the encryption method used by the encryption module, in this way, the decryption unit can decrypt the encrypted identification code after receiving it so as to acquire the identification code of the electronic equipment.

Step S22, a second determination unit of a second processing module of the unlocking key determines whether the identification code is consistent with a preset identification code, if the identification code is consistent with the preset identification code, proceed to step S23, otherwise return to step S11.

In the embodiment, the preset identification code can be an identification code for uniquely identifying the unlocking key that pre-stored in the unlocking key, and the preset identification code is typically a character sequence and is consistent with an identification code of an electronic equipment that matches the unlocking key.

Step S23, the second determination unit outputs an unlocking signal.

Step S24, an execution module of the controller receives the unlocking signal from the second determination unit and unlocks the electronic equipment.

In the method for unlocking an electronic equipment provided by embodiments of the present disclosure, the electronic equipment detects periodically whether there is an unlocking key in its surrounding environment, and when the unlocking key exists, transmits to the unlocking key an identification code of the electronic equipment, the unlocking key can thus acquire the identification code of the electronic equipment, and unlock the electronic equipment when the identification code is consistent with a preset identification code, thus the method provided by embodiments of the present disclosure makes it possible that the unlocking key can automatically unlock the electronic equipment when it approaches the latter, in this way, the user can unlock the electronic equipment without any manual operations, thereby facilitating convenience of using the electronic equipment.

It should be appreciated that what described are merely preferable embodiments of the present disclosure, and are not intended to limit the scope of protection of the present disclosure. All equivalent structures and flow changes made using the specification and accompanying drawings of the present disclosure, or direct or indirect applications of the present disclosure to other related technical fields should be included within the scope of protection of the present disclosure.

The invention claimed is:

1. A method for unlocking an electronic equipment, comprising:
   detecting periodically, by the electronic equipment, whether there is an unlocking key in a surrounding environment, and when there is an unlocking key in the surrounding environment, transmitting an unlocking request to the unlocking key;
   receiving, by the unlocking key, the unlocking request, determining in accordance with the unlocking request whether the electronic equipment matches the unlocking key, and when a determination is made that the electronic equipment matches the unlocking key, transmitting an unlocking signal to the electronic equipment so as to unlock the electronic equipment;
   wherein the step of detecting periodically, by the electronic equipment, whether there is an unlocking key in a surrounding environment comprises:
   outputting, by the electronic equipment, a wireless signal, wherein the wireless signal carries graphic identifier information of an unlocking key that matches the electronic equipment;
   receiving, by the unlocking key, the wireless signal and acquiring the graphic identifier information carried in the wireless signal;
   determining, by the unlocking key, whether the graphic identifier information carried in the wireless signal is consistent with preset information, and when a determination is made that the graphic identifier information carried in the wireless signal is consistent with the preset information, outputting an acknowledgement signal to the electronic equipment, wherein the preset information is graphic identifier information corresponding to the unlocking key pre-stored in the unlocking key;
   determining, by the electronic equipment, whether the acknowledgement signal is received within a preset period of time, determining that there is an unlocking key in the surrounding environment when a determination is made that the acknowledgement signal is received within the preset period of time, and determining that there isn't an unlocking key in the surrounding environment when a determination is made that the acknowledgement signal is not received within the preset period of time.

2. The method according to claim 1, wherein the step of transmitting an unlocking request to the unlocking key comprises:
   acquiring an identification code of the electronic equipment, encrypting the identification code, and outputting the encrypted identification code to the unlocking key.

3. The method according to claim 2, wherein the receiving by the unlocking key the unlocking request and determining in accordance with the unlocking request whether the electronic equipment matches the unlocking key comprises:
   receiving, by the unlocking key, the encrypted identification code, decrypting the encrypted identification code, and acquiring the identification code of the electronic equipment;
   determining whether the identification code of the electronic equipment is consistent with a preset identification code, determining that the electronic equipment matches the unlocking key when it is determination is made that the identification code of the electronic equipment is consistent with the preset identification code, and determining that the electronic equipment doesn't match the unlocking key when a determination is made that the identification code of the electronic equipment is inconsistent with the preset identification code.

4. A device for unlocking an electronic equipment, comprising a controller arranged in the electronic equipment and an unlocking key that is independent from the electronic equipment, the unlocking key being an unlocking member corresponding to the electronic equipment with a shape of a physical key or a card-like shape, wherein the controller is configured to detect periodically whether there is an unlocking key in its surrounding environment, and when there is an unlocking key in the surrounding environment, transmit an unlocking request to the unlocking key, and unlock the electronic equipment after receiving an unlocking signal from the unlocking key;

the unlocking key is configured to receive the unlocking request, determine in accordance with the unlocking request whether the electronic equipment matches the unlocking key, and when it is determination is made that the electronic equipment matches the unlocking key, transmit the unlocking signal to the controller;

wherein the controller is configured to output a wireless signal, wherein the wireless signal carries graphic identifier information of an unlocking key that matches the electronic equipment, and continue to output the wireless signal to the surrounding environment after receiving a searching failure signal;

wherein the unlocking key comprises a first processing module, and the first processing module is configured to receive the wireless signal, acquire the graphic identifier information carried in the wireless signal, determine whether the graphic identifier information carried in the wireless signal is consistent with preset information, and when a determination is made that the information carried in the wireless signal is consistent with the preset information, output an acknowledgement signal to the controller, wherein the preset information is graphic identifier information corresponding to the unlocking key pre-stored in the unlocking key; and wherein the controller is further configured to receive the acknowledgement signal and determine whether the acknowledgement signal is received within a preset period of time, when a determination is made that the acknowledgement signal is received within the preset period of time, determine that there is an unlocking key in the surrounding environment and output a determination signal, and when a determination is made that the acknowledgement signal is not received within the preset period of time, determine that there isn't an unlocking key in the surrounding environment and output the searching failure signal.

5. The device according to claim 4, wherein the controller is further configured to receive the determination signal and acquire an identification code of the electronic equipment, encrypt the identification code of the electronic equipment and output the encrypted identification code.

6. The device according to claim 5, wherein the unlocking key further comprises a second processing module;

the second processing module is configured to decrypt the encrypted identification code, acquire the identification code of the electronic equipment and determine whether the identification code of the electronic equipment is consistent with a preset identification code, when a determination is made that the identification code of the electronic equipment is consistent with the preset identification code, determine that the electronic equipment matches the unlocking key where the second processing module is located and output an unlocking signal to the controller, when a determination is made that the identification code of the electronic equipment is inconsistent with the preset identification code, determine that the electronic equipment doesn't match the unlocking key where the second processing module is located;

the controller is further configured to unlock the electronic equipment after receiving the unlocking signal.

7. An unlocking key for unlocking an electronic equipment, the unlocking key being an unlocking member corresponding to the electronic equipment with a shape of a physical key or a card-like shape and configured to receive an unlocking request transmitted by the electronic equipment, determine in accordance with the unlocking request whether the electronic equipment matches the unlocking key, and when a determination is made that the electronic equipment matches the unlocking key, transmit an unlocking signal to the electronic equipment so as to unlock the electronic equipment;

wherein the unlocking request is an identification code of the electronic equipment, and the unlocking key comprises a first processing module and a second processing module;

the first processing module is configured to receive a wireless signal output by the electronic equipment, wherein the wireless signal carries graphic identifier information of an unlocking key that matches the electronic equipment, acquire the graphic identifier information carried in the wireless signal and determine whether the graphic identifier information carried in the wireless signal is consistent with preset information, and when a determination is made that the information carried in the wireless signal is consistent with the preset information, output an acknowledgement signal to the electronic equipment, wherein the preset information is graphic identifier information corresponding to the unlocking key pre-stored in the unlocking key;

the second processing module is configured to receive and decrypt the encrypted identification code of the electronic equipment, which is transmitted by the electronic equipment, determine whether the identification code of the electronic equipment is consistent with a preset identification code, and when a determination is made that the identification code of the electronic equipment is consistent with the preset identification code, determine that the electronic equipment matches the unlocking key where the second processing module is located and output the unlocking signal.

\* \* \* \* \*